(12) United States Patent
Uemura et al.

(10) Patent No.: US 6,808,280 B2
(45) Date of Patent: Oct. 26, 2004

(54) LINE-ILLUMINATING DEVICE

(75) Inventors: Yoshiyuki Uemura, Osaka (JP);
Tomihisa Saito, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 151 days.

(21) Appl. No.: 10/016,587

(22) Filed: Oct. 22, 2001

(65) Prior Publication Data

US 2002/0054490 A1 May 9, 2002

(30) Foreign Application Priority Data

Oct. 24, 2000 (JP) ........................................ 2000-324099

(51) Int. Cl.[7] .................................................. F21V 7/04
(52) U.S. Cl. ............................. 362/31; 362/31; 362/26; 362/27; 385/146
(58) Field of Search ............................. 362/31, 26, 27; 385/146

(56) References Cited

U.S. PATENT DOCUMENTS 4,151,582 A * 4/1979 Grunberger .................. 362/31
6,371,623 B1 * 4/2002 Toyoda .......................... 362/31
6,422,710 B1 * 7/2002 Herzog et al. ................. 362/23
6,425,684 B1 * 7/2002 Kranzler et al. ............. 362/551

FOREIGN PATENT DOCUMENTS

| JP | 8-163320 | 6/1996 |
| JP | 10-12651 | 5/1998 |

* cited by examiner

*Primary Examiner*—Sandra O'Shea
*Assistant Examiner*—Bertrand Zeade
(74) *Attorney, Agent, or Firm*—Merchant & Gould P.C.

(57) ABSTRACT

A line-illuminating device 10, 20 having a light guide 11, 21 of which the cross-sectional shape is rectangular and its one corner is chamfered to form an emission plane 11a, 21a is provided, in which the light guide 11, 21 is housed in a light guide casing 12, 22, wherein the chamfer dimension of the emission plane 11a, 21a is more than 40% of a height dimension of the light guide 11, 21. By enlarging the chamfer dimension and broadening the width of the emission plane 11a, 21a, the directional characteristics of the emitted light is expanded. In this manner, it is possible to reduce the extent of decrease in the quantity of illuminating light on a document surface when the document surface is elevated.

4 Claims, 12 Drawing Sheets

FIG.3 Light output characteristics of line-illuminating device according to the present invention

FIG. 6 Light output characteristics of line-illuminating device according to the present invention
(Chamfer dimension of emission plane R=2.0mm)

FIG.11 Light output characteristics of a conventional line-illuminating device (Chamfer dimension of emission plane C=0.5mm)

FIG.12

LINE-ILLUMINATING DEVICE

BACKGROUND OF THE INVENTION

1. Field of the Invention

The present invention relates to a line-illuminating device which is used in a contact-type image sensor (CIS).

2. Description of the Prior Art

A contact-type image sensor is used as a device for reading a document (i.e. a document reading device) using a facsimile machine, a copying machine, a scanner and the like. This contact-type image sensor is provided with a line-illuminating device for linearly illuminating a document surface along a main scanning range.

Figure 7:
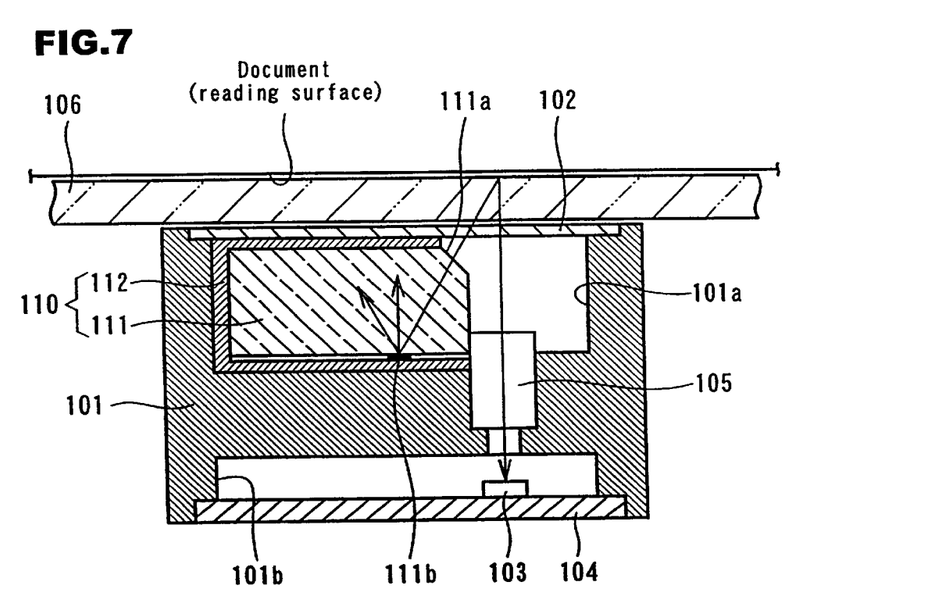
FIG. 7 is a cross-sectional view of a document reading device incorporating a conventional line-illuminating device therein.
Figure 8:
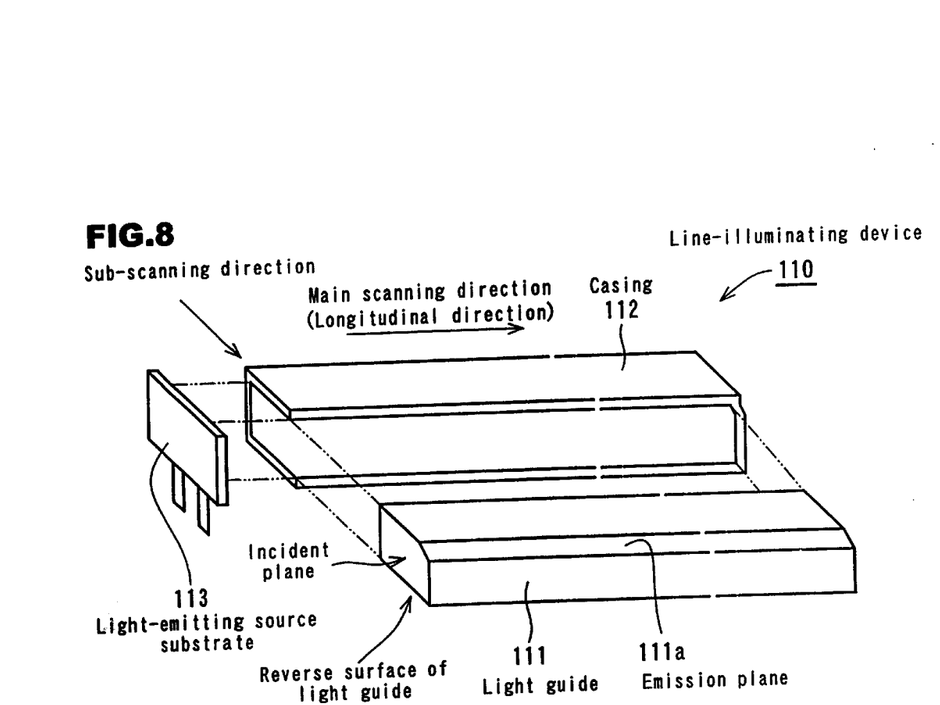
FIG. 8 is an exploded perspective view of the conventional line-illuminating device.
Figure 9:
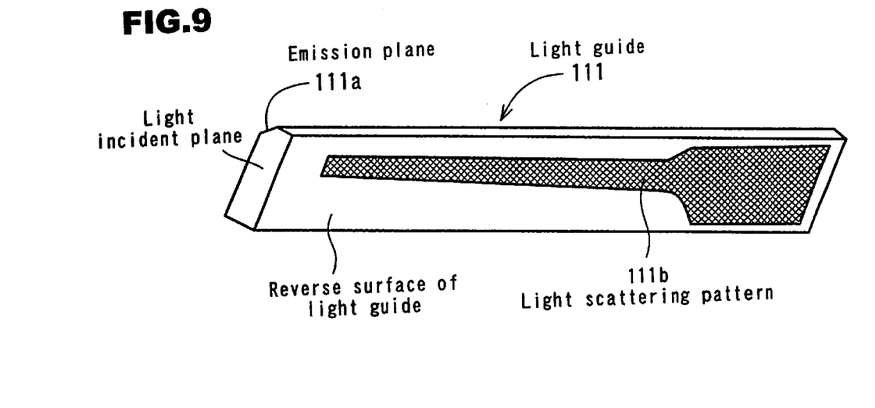
FIG. 9 is a perspective view showing one example of a light scattering pattern formed on the reverse surface of a light guide.

The line-illuminating device using a light guide is known. The line-illuminating device using a bar-shaped or plate-shaped light guide and a document reading device provided with such a line-illuminating device are disclosed in Japanese Unexamined Patent Publication Nos. Hei 8-163320 and Hei 10-126581. FIG. 7 is a cross-sectional view of a document reading device incorporating a conventional line-illuminating device therein and FIG. 8 is an exploded perspective view of the conventional line-illuminating device. FIG. 9 is a perspective view showing one example of a light-scattering pattern formed on the reverse surface of a light guide.

As shown in FIG. 7, the document reading device is provided with a frame 101 in which recesses 101a and 101b are formed. A line-illuminating device 110 is arranged in the recess 101a of which the opening section is closed by a glass plate 102. A sensor substrate 104 provided with a photo-electric conversion element (sensor) 103 is attached to the recess 101b. A rod lens array 105 is also held within the frame 101. The document reading device allows the light emitted from an emission plane 111 of the line-illuminating device 110 to be incident on a reading surface of a document through a cover glass 106 serving as a document stand. The document is read by detecting the reflected light using the photoelectric conversion element (sensor) 103 through the rod lens array 105.

In the line-illuminating device 110 shown in FIG. 8, a light guide 111 is housed in a white light guide casing 112 in such a manner that the emission plane 111a is exposed. A light emitting source substrate 113 provided with a light-emitting source such as a light-emitting diode (LED) is attached to one end of the light guide casing 112. The light guide 111 is made of glass or transparent resin and its basic cross-sectional shape in the direction at right angles to a main-scanning direction (i.e. a longitudinal direction) is rectangular, wherein the corner section is chamfered in a C-shape to form the emission plane 111a.

As shown in FIG. 9, the light guide 111 is provided, on its reverse surface, with a light-scattering pattern 111b for scattering the light from the light-emitting source incident from an incident plane. The light-scattering pattern is formed by screen printing a white coating material.

This line-illuminating device 110 is arranged to allow light from the light-emitting source such as an LED to enter from one end of the light guide 111 (i.e. the incident plane) into the inside of the light guide 111, to allow the light spreading through the light guide 111 to be scattered by the light-scattering pattern 111b which is formed on the reverse surface of the light guide 111, and to allow the scattered light to be emitted from the emission plane 111a (see FIG. 7).

Intensity of light incident from the light-emitting source is high near the incident plane, while the intensity of light becomes lower as the light advances further from the incident plane. Now, as shown in FIG. 9, by broadening a forming area of the light-scattering pattern as the light advances further from the incident plane, it is intended that the intensity of light emitted from the emission plane 111a be uniform over the full length of the main-scanning direction.

As shown in FIGS. 7 and 8, covering the light guide 111 by the light guide casing 112 not only protects the light guide 111, but also prevents the scattered light from being uselessly emitted outside the light guide 111 and increases the intensity of light emitted.

Figure 10:
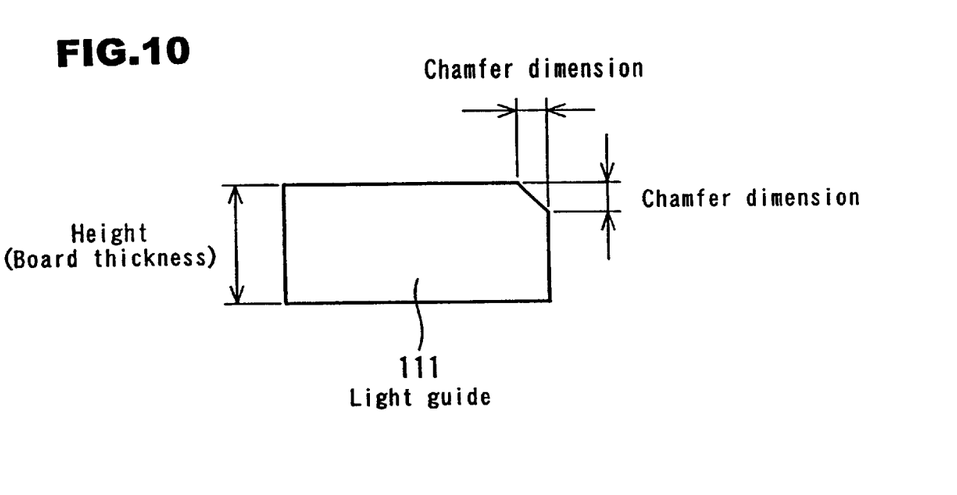
FIG. 10 is a view showing dimensions of an emission plane in the conventional line-illuminating device.

FIG. 10 is a view showing dimensions of an emission plane of a conventional line-illuminating device. In the conventional line-illuminating device 110, a chamfer dimension of the emission plane 111a is about 20~25% of the board thickness of the light guide 111. For example, when the height (i.e. the board thickness) of the light guide 111 is 2 mm, the chamfer dimension is about 0.4~0.5 mm. In this manner, by making the chamfer dimension smaller, directivity of emitted light is narrowed to improve intensity of the emitted light.

Figure 11:
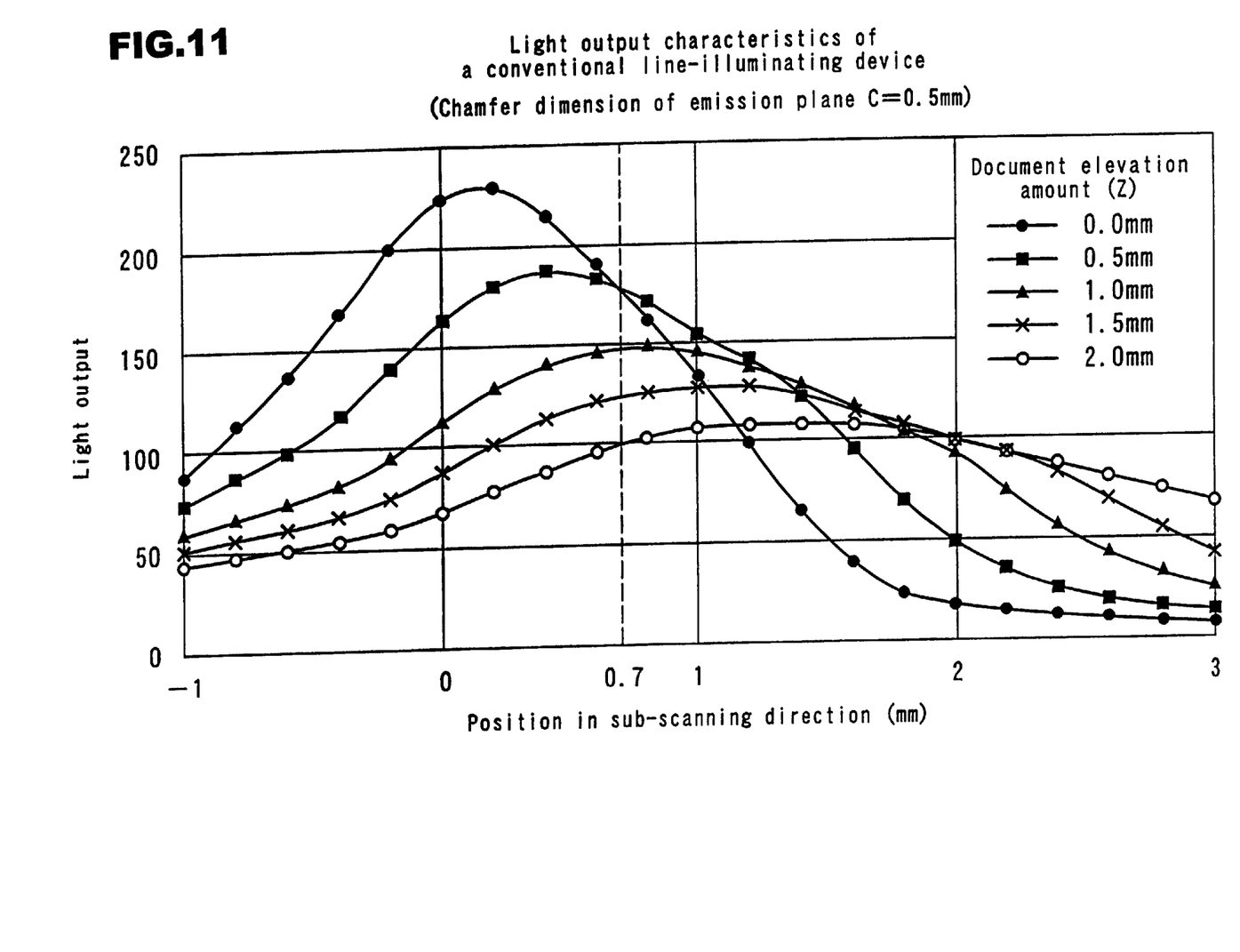
FIG. 11 is a graph showing light output distribution characteristics of the conventional line-illuminating device.
Figure 12:
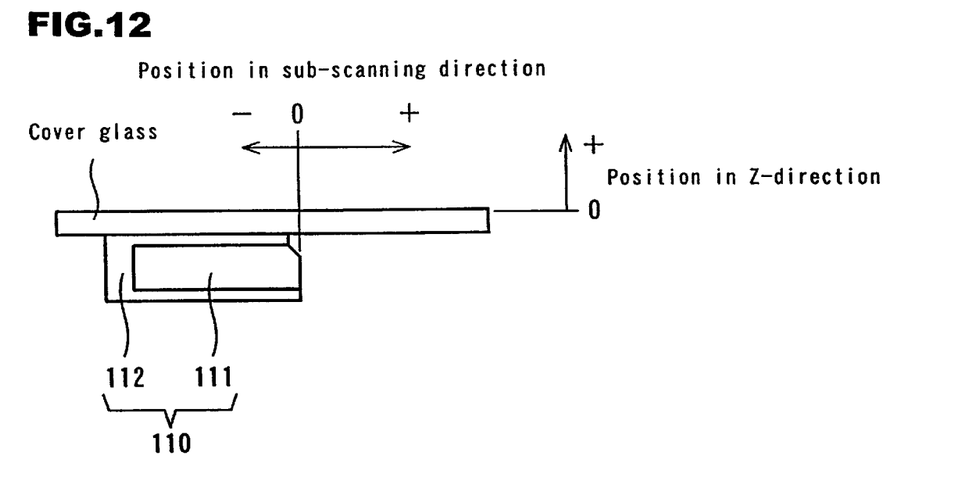
FIG. 12 is a view showing a measuring position of the light output distribution.
Figure 13:
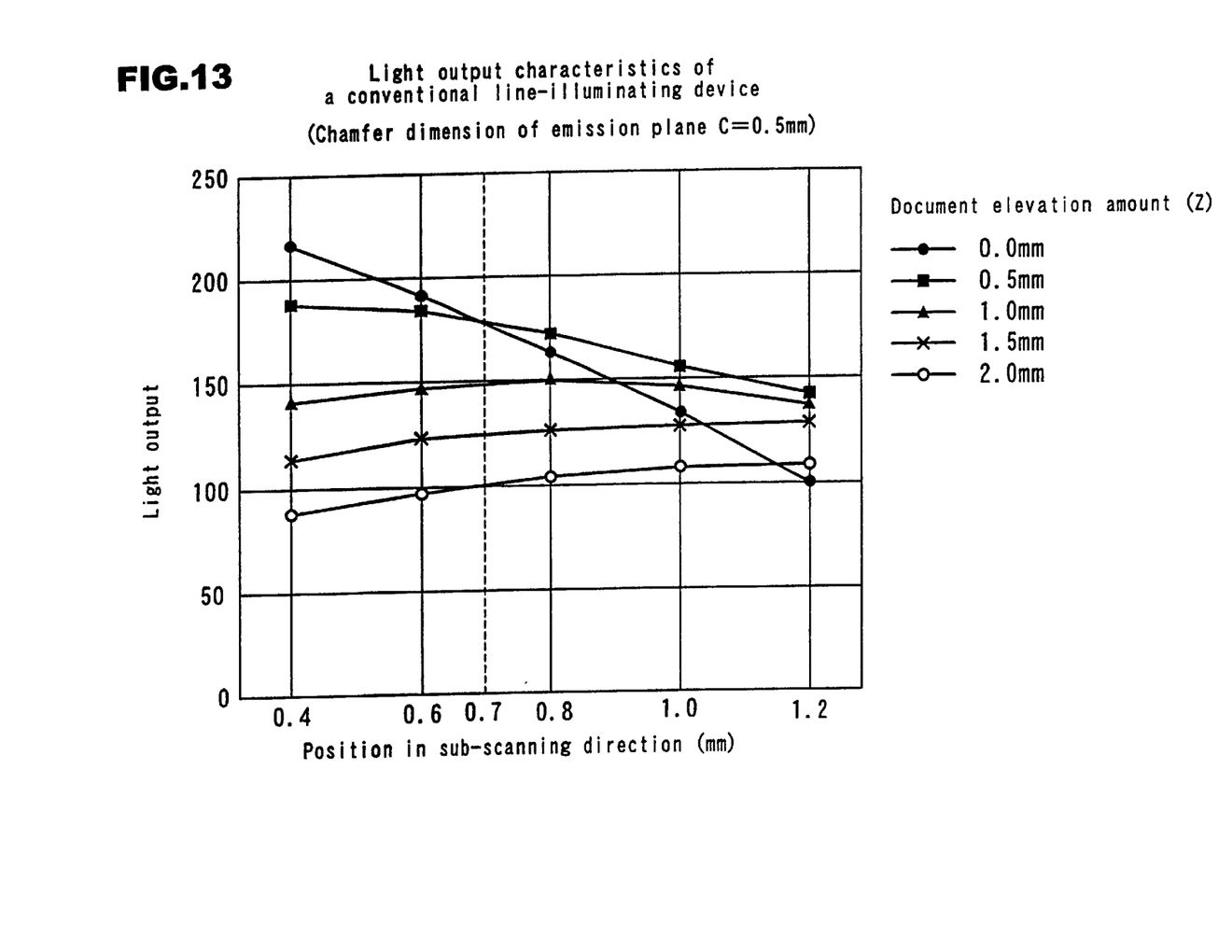
FIG. 13 is a graph enlargedly showing light output distribution characteristics of the conventional line-illuminating device shown in FIG. 11 in which a position in a sub-scanning direction is a range of 0.4–1.2 mm.

FIG. 11 is a graph showing light output distribution characteristics of the conventional line-illuminating device and FIG. 12 is a view showing a measuring position of the light output distribution. FIG. 13 is a graph enlargedly showing the light output distribution characteristics of the conventional line-illuminating device shown in FIG. 11 in which the position in a sub-scanning direction is a range between 0.4 and 1.2 mm.

In FIG. 11, the vertical axis shows the light output and the horizontal axis shows the position in the sub-scanning direction. The position in the sub-scanning direction is, as shown in FIG. 12, arranged so that an end surface of the light guide 111 where the emission plane 111a is formed is the origin 0. Measurement of the light output distribution was made in a condition where the line-illuminating device 110 contacts the lower surface of the cover glass. Thickness of the cover glass is 1.1 mm. The upper surface of the cover glass is the origin 0 in the position in the Z-direction.

In FIG. 11, a round black dot indicates the light output distribution characteristics in which a document surface contacts the cover glass (Z=0.0 mm). A square mark indicates the light output distribution characteristics in which the document surface is elevated from the cover glass by 0.5 mm (Z=0.5 mm). A triangular mark indicates the light output distribution characteristics in which the document surface is elevated from the cover glass by 1.0 mm (Z=1.0 mm). An x mark indicates the light output distribution characteristics in which the document surface is elevated from the cover glass by 1.5 mm (Z=1.5 mm). A round mark indicates the light output distribution characteristics in which the document surface is elevated from the cover glass by 2.0 mm (Z=2.0 mm). Measurement of the light output distribution characteristics was made at a central position in the main scanning direction (i.e. the central position of the light guide in the longitudinal direction).

In the conventional document reading device, an optical axis of the rod lens array 105 is arranged at a place where the position in the sub-scanning direction is about 0.7 mm (0.6–0.8 mm). A light-receiving surface of the photoelectric conversion element (sensor) 103 is arranged on the optical axis.

In the conventional document reading device in which an optical axis of the rod lens array 105 is arranged at a position where the position in the sub-scanning direction is 0.7 mm and that position is a document reading position, decrease of the quantity of light becomes 45% when the document is elevated by 2 mm. Even when a position where the position in the sub-scanning direction is 1.2 mm is a document reading position, decrease of the quantity of light becomes 30% relative to the elevation of the document (Z=0–2.0 mm).

Accordingly, in the document reading device incorporating the conventional line-illuminating device therein, the quantity of illuminating light decreases remarkably when the document surface is elevated by a fold or two facing pages of the document, and unnatural shades are produced on the image read through the photoelectric conversion element (sensor).

SUMMARY OF THE INVENTION

It is therefore an object of the present invention to solve such problems as stated above and to provide a line-illuminating device which can reduce a change in quantity of illuminating light when a document surface is elevated from a cover glass and which can obtain good images with less deterioration even when a document surface is elevated.

To solve the above-mentioned problems, according to the invention as defined in claim 1, a line-illuminating device having a light guide of which the cross-sectional shape is rectangular and the corner section is chamfered to form an emission plane is provided, in which the chamfer dimension is more than 40% of the height dimension of the light guide. According to the invention as defined in claim 2, the line-illuminating device is provided, in which the emission plane is spherically chamfered. As far as an area of the emission plane is concerned, all surface exposed from a light guide casing can be the emission plane.

By enlarging the chamfer dimension to broaden the width of the emission plane or by making a chamfer shape spherical, it is possible to expand the directional characteristics of the emitted light and thus to reduce the extent of decrease of the quantity of illuminating light on a document surface when the document surface is elevated from the cover glass. Accordingly, it is possible to obtain good images with less deterioration even when the document surface is elevated.

BRIEF DESCRIPTION OF THE DRAWINGS

The above and other objects, features and advantages of the present invention will become more apparent from the following description when taken in conjunction with the accompanying drawings.

DETAILED DESCRIPTION OF THE PREFERRED EMBODIMENTS

Preferred embodiments of the present invention will now be described with reference to the accompanying drawings. FIG. 1 is a cross-sectional view of a line-illuminating device according to the present invention.

Figure 1A:
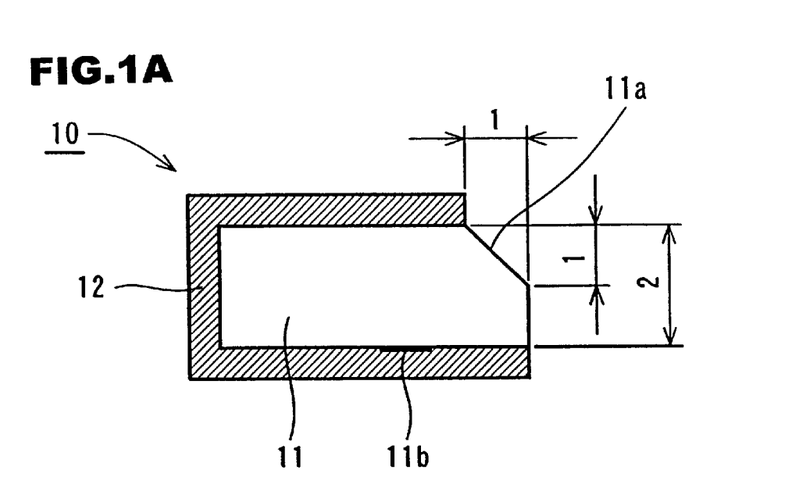
FIG. 1 is a cross-sectional view of a line-illuminating device according to the present invention.

In a line-illuminating device 10 shown in FIG. 1(a), a light guide 11 of which the height dimension (i.e. board thickness) is 2 mm is provided, in which one corner section of the light guide 11 is C-chamfered with a chamfer dimension of 1 mm, wherein the C-chamfered surface serves as an emission plane 11a. Reference numeral 11b is a light scattering pattern formed on the reverse surface of the light guide 11 by printing or the like, and reference numeral 12 is a light guide casing. The line-illuminating device 10 is arranged in such a manner that the light guide 11 is housed in the light guide casing 12 exposing its emission plane 11a.

Figure 1B:
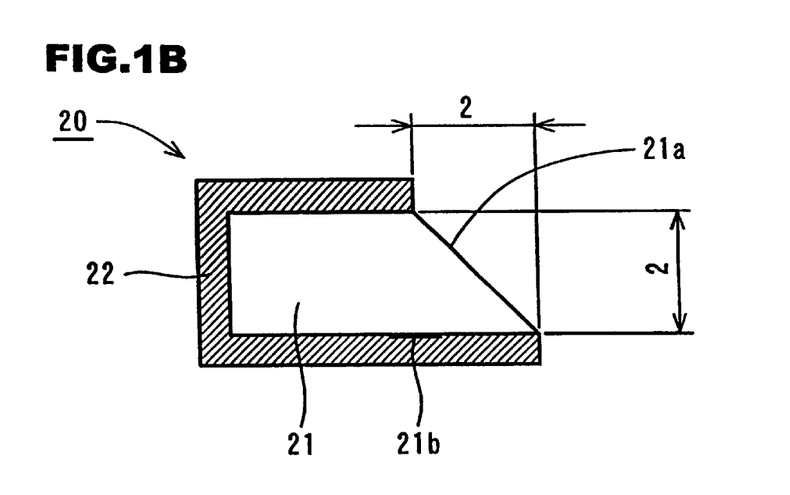
Figure 2:
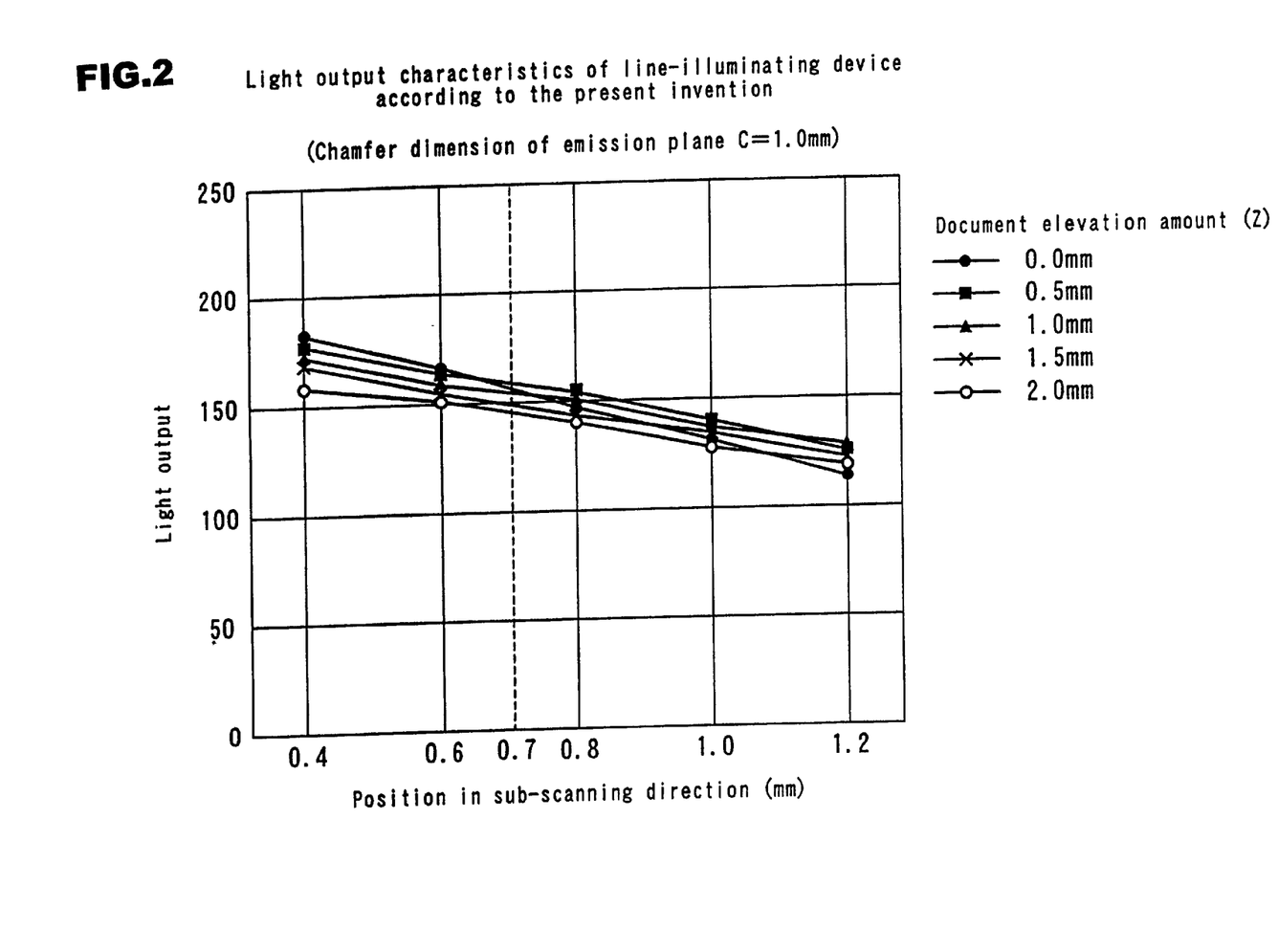
FIG. 2 is a graph showing light output distribution characteristics of the line-illuminating device shown in FIG. 1(a)
Figure 3:
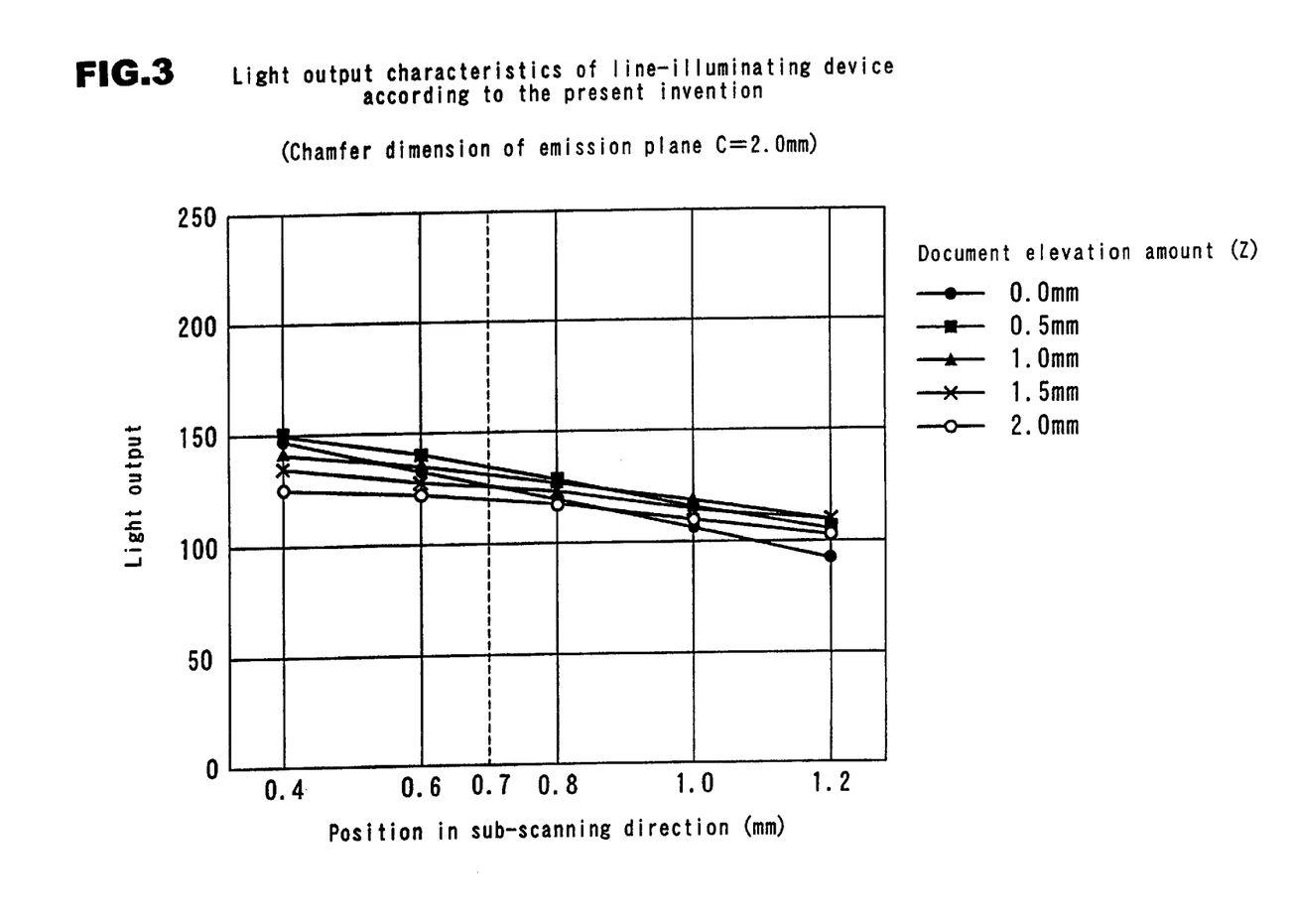
FIG. 3 is a graph showing light output distribution characteristics of the line-illuminating device shown in FIG. 1(b)

In a line-illuminating device 20 shown in FIG. 1(b), a light guide 21 of which the height dimension (i.e. board thickness) is 2 mm is provided, in which one corner section of the light guide 21 is C-chamfered with a chamfer dimension of 2 mm, wherein the C-chamfered surface serves as an emission plane 21a. Reference numeral 21b is a light scattering pattern formed on the reverse surface of the light guide 21 by printing or the like, and reference numeral 22 is a light guide casing. The line-illuminating device 20 is arranged in such a manner that the light guide 21 is housed in a light guide casing 22 exposing the emission plane 21a FIG. 2 is a graph showing light output distribution characteristics of the line-illuminating device shown in FIG. 1(a) and FIG. 3 is a graph showing light output distribution characteristics of the line-illuminating device shown in FIG. 1(b). In the line-illuminating device 10 shown in FIG. 1(a) and the line-illuminating device 20 shown in FIG. 1(b), peak quantity of light at a focal point (a position in the sub-scanning direction: 0.7 mm) decreases by 30–40% compared with the conventional line-illuminating device 110. However, decrease of the quantity of light when the document is elevated by 2 mm is about 10% relative to the quantity of light when the amount of elevation of the document is 0 mm. This means that the decrease in the quantity of light is less relative to the elevation of the document. Accordingly, in the document reading device incorporating the line-illuminating device according to the present invention, it is possible to obtain good images with less deterioration in the reading image even when the document surface is elevated.

Light quantity decrease ratio (%) is defined by the following expression: Light quantity decrease ratio (%)={L(Z=0)−L(Z=2)}/L(Z=0)×100 where L(Z=0) is the quantity of light when the document is not elevated, and L(Z=2) is the quantity of light when the document is elevated from the cover glass by 2 mm.

Figure 4:
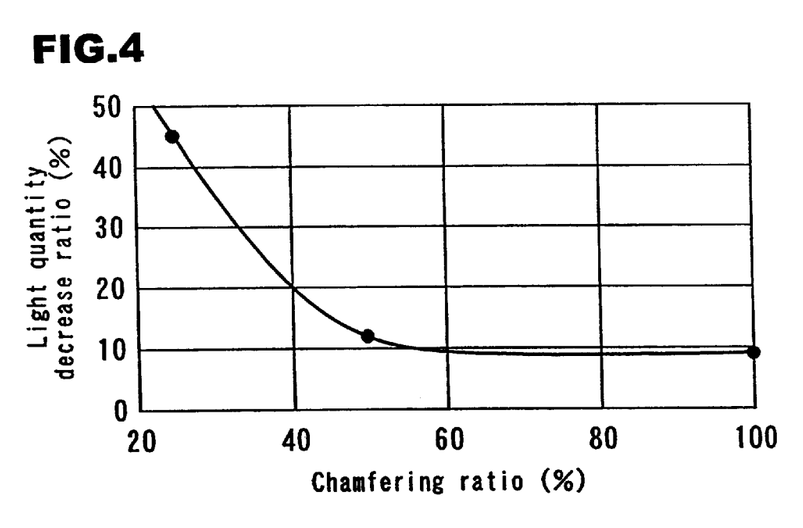
FIG. 4 is a graph showing the relationship between a chamfer dimension of an emission plane and a light quantity decrease ratio (i.e. a decrease quantity in the quantity of light when a document is elevated by 2 mm relative to the quantity of light when an amount of elevation of the document is 0 mm)

FIG. 4 is a graph showing the relationship between a chamfer dimension of an emission plane and a light quantity decrease ratio (i.e. the decrease in the quantity of light when the document is elevated by 2 mm relative to the quantity of light when the amount of elevation of the document is 0 mm). In FIG. 4, the vertical axis shows the light quantity decrease ratio and the horizontal axis shows the ratio of the chamfer dimension relative to the height of the light guide (i.e. board thickness). When the height of the light guide (board thickness) is 2 mm, the chamfer dimension of 1 mm is a chamfer ratio of 50% and the chamfer dimension of 2 mm is a chamfer ratio of 100%. It is to be noted from the graph of FIG. 4 that if the chamfer ratio is set at more than 40%, the light quantity decrease ratio becomes less than 20%.

The quantity of illuminating light in the document reading line decreases if the width of the emission planes 11a, 21a is broadened and the directional characteristics of the emitted light is expanded. However, it is possible to secure the necessary quantity of illuminating light by adopting a high-intensity type light-emitting diode of which the luminous efficiency is high as a light-emitting source or by increasing the number of light-emitting diodes.

Figure 5:
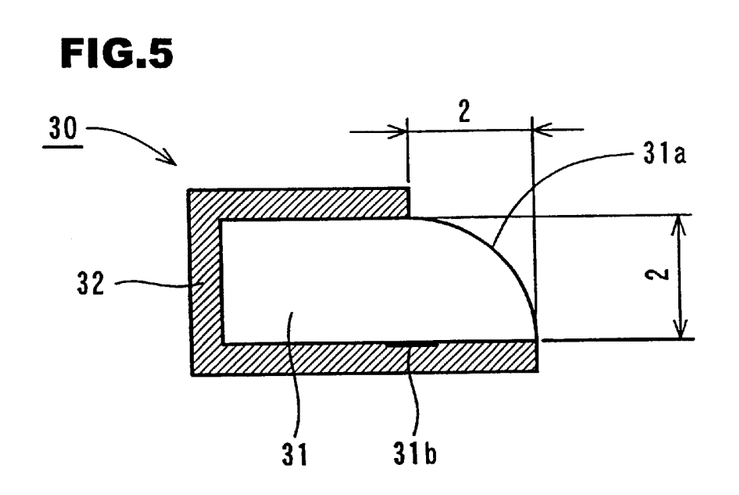
FIG. 5 is a cross-sectional view of another line-illuminating device according to the present invention.

FIG. 5 is a cross-sectional view of another line-illuminating device according to the present invention. In the line-illuminating device 30 shown in FIG. 5, a light guide 31 of which the height dimension (i.e. board thickness) is 2 mm is provided, in which one corner section of the light guide 31 is chamfered with a radius of 2 mm to have a circular cross-section (¼ circle), wherein this cylindrical chamfered surface is adapted to serve as an emission plane 31a. Reference numeral 31b is a light scattering pattern formed on the reverse surface of the light guide 31 by printing or the like, and reference numeral 32 is a light guide casing. The line-illuminating device 30 is arranged in such a manner that the light guide 31 is housed in the light guide casing 32 exposing its emission plane 31a.

Figure 6:
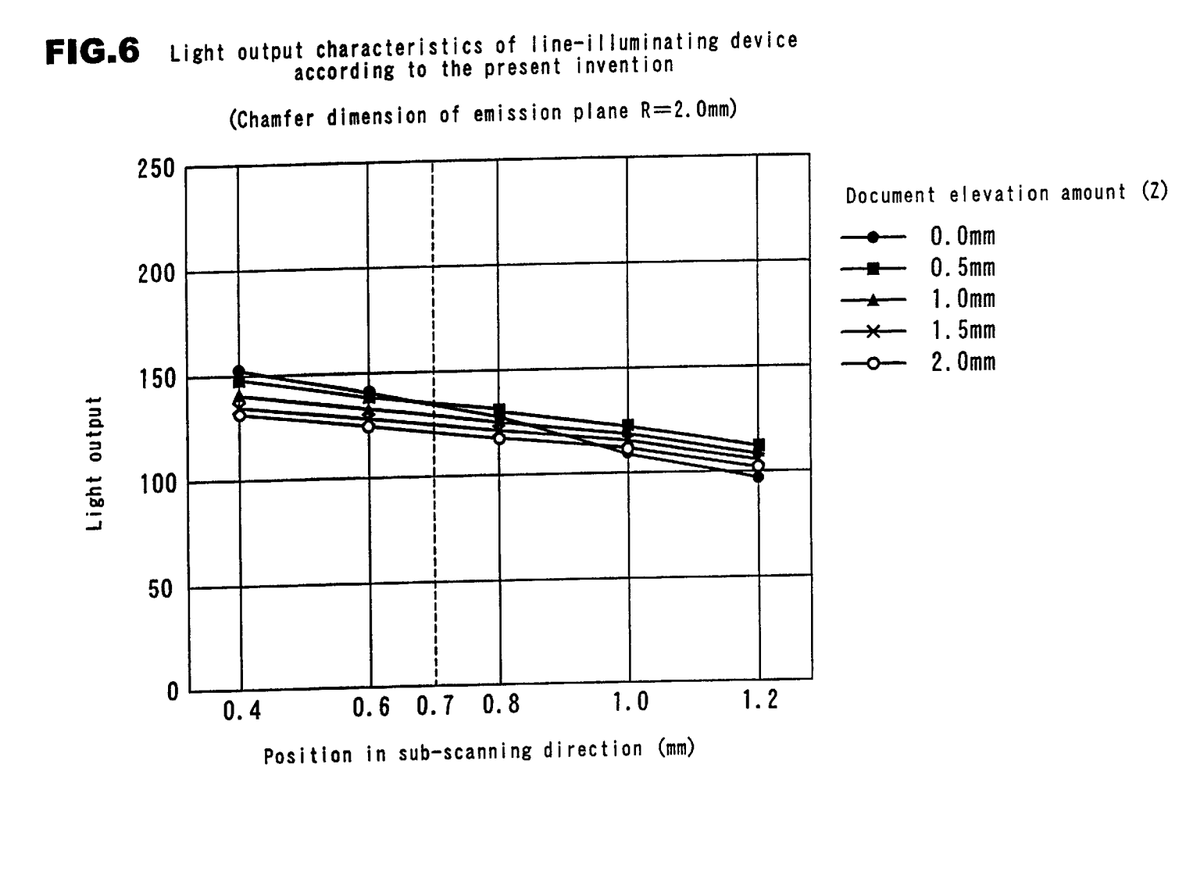
FIG. 6 is a graph showing light output distribution characteristics of the line-illuminating device shown in FIG. 5.

FIG. 6 is a graph showing light output distribution characteristics of the line-illuminating device shown in FIG. 5. In the line-illuminating device 30 shown in FIG. 5, peak quantity of light at a focal point (i.e. the position in the sub-scanning direction: 0.7 mm) decreases by 40% compared with the conventional line-illuminating device 110. However, the decrease in the quantity of light when the document is elevated by 2 mm is about 10% relative to the quantity of light when the amount of elevation of the document is 0 mm. This means that the decrease in the quantity of light is small relative to the elevation of the document. Accordingly, in the document reading device incorporating the line-illuminating device according to the present invention, it is possible to obtain good images with less deterioration in the reading image even when the document surface is elevated.

As described above, the line-illuminating device according to the present invention is provided with a light guide of which the cross-sectional shape is rectangular and its corner section is chamfered to form the emission plane, wherein the chamfer dimension is set to be more than 40% of the height dimension of the light guide. In this manner, the width of the emission plane is broadened and the directional characteristics of the emitted light is expanded. Thus, it is possible to reduce the extent of decrease in the quantity of illuminating light of the document surface when the document surface is elevated. Accordingly, it is possible to obtain good images with less deterioration in the reading image even when the document surface is elevated.

What is claimed is:

1. A line illuminating device having a light guide of which cross-sectional shape is rectangular and its corner section is chamfered to form an emission plane is provided, said light guide having a height dimension and said corner section having a chamfer height dimension, said device characterized in that the chamfer height dimension is more than 40% of the height dimension of the light guide.

2. A line-illuminating device having a light guide of which the cross-sectional shape is rectangular and its corner section has a chamfer shape to form an emission plane characterized in that the chamfer shape is partially circular in cross-section.

3. The line-illuminating device according to claim 1, wherein the light guide is housed in a casing, and an entire area of the light guide exposed from the casing serves as the emission plane.

4. The line-illuminating device according to claim 2, wherein the light guide is housed in a casing, and an entire area of the light guide exposed from the casing serves as the emission plane.

* * * * *